(No Model.)

O. A. WILSON.
KNIFE HANDLE.

No. 251,150. Patented Dec. 20, 1881.

Witnesses.

Inventor:
Orville A. Wilson
by Crosby & Gregory
Attys

UNITED STATES PATENT OFFICE.

ORVILLE A. WILSON, OF BENNINGTON, ASSIGNOR TO GOODELL COMPANY, OF ANTRIM, NEW HAMPSHIRE.

KNIFE-HANDLE.

SPECIFICATION forming part of Letters Patent No. 251,150, dated December 20, 1881.

Application filed May 28, 1881. (No model.)

*To all whom it may concern:*

Be it known that I, ORVILLE A. WILSON, of Bennington, county of Hillsborough, State of New Hampshire, have invented an Improvement in Table-Cutlery, of which the following description, in connection with the accompanying drawings, is a specification.

My invention relates to table-cutlery; and it consists in a skeleton-handle composed of a continuous wire bent into a loop, its ends being brought opposite one another and offset, combined with the shank portion of the blade placed in connection with the said ends, and a metal bolster cast upon the meeting ends of the said handle and shank and completely embedding the offset portion to rigidly secure the said handle and blade together and afford a neat and inexpensive finish for the joint between them. The blade, instead of having formed or welded thereon the usual bolster and tang, or having a solid metal handle formed as one piece therewith, is provided with a short stout shank properly notched to leave tenons projecting in a direction toward the back and edge of the blade, the said tenons fitting in mortises or sockets in the ends of the wire which forms the handle. When the blade and handle are thus mortised or jointed together the said joint is embedded in metal cast over it into the shape of the usual bolster, thus making the joint rigid and the union between the blade and handle very strong, and giving a neat finish to the knife.

Figure 1:
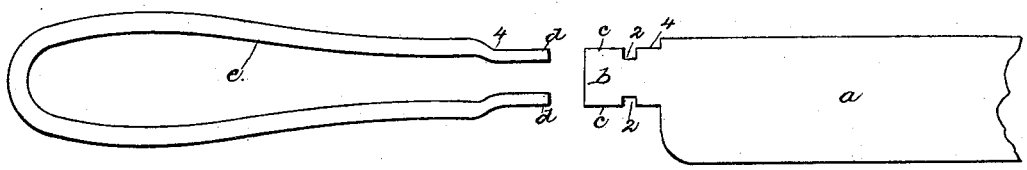
Figure 2:

Figure 1 is a side elevation of a knife blade and handle detached, they being properly formed to be united in accordance with my invention; Fig. 2, a top view of the joint portion thereof, and Fig. 3 a side elevation of the finished knife.

The blade portion *a* of the knife is provided with a shank, *b*, preferably made as part of the blank for the blade, and having notches 2, to form tenons *c*, extending up and down from the said shank *b*.

The handle *e* is composed of a wire bent in proper shape, and having at its ends *d*, which may be somewhat flattened, as shown, for the purpose, rectangular holes or mortises 3, to receive the tenons *c* of the shank *b* of the knife-blade, as shown in Fig. 2. When the blade and handle are placed together, with the tenon *c* in the mortise or socket 3, a very strong joint is formed, its strength being only limited by that of the materials forming it; and in order to retain the two portions thus jointed together and to properly finish the knife, metal is cast over the joint, as shown at *m*, Fig. 3, it being made in the shape of the usual bolster or hilt of the knife.

Figure 3:
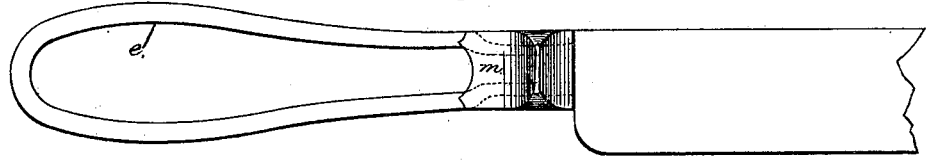

The shank *b* and wire *e* of the handle are preferably somewhat offset from the line of the back of the blade and main portion of the handle, as shown at 4, so that the metal *m*, when brought in line with the main portion of the handle and back of the knife-blade, as shown in Fig. 3, will wholly embed the joint between the said handle and blade.

The strength of the union between the handle and blade consists, mainly, in the joint or mortises and tenons, so that a soft metal may be employed to cover the joint and form the bolster.

The cast metal may, if desired, extend the entire length of the handle, giving it the appearance of the usual metal-handled knives, the skeleton wire handle *e* affording the strength and rigidity and the union with the blade, so that a soft readily cast and finished metal may be employed, which would, however, otherwise not have sufficient rigidity and strength.

I am aware that it is not new to connect a blade having a short notched tang with a skeleton wire handle by upsetting the ends of the said handle into the notches of the tang, or by welding or brazing them thereto; but in this construction the tang itself forms the only bolster and requires expensive manipulation to give a good appearance. Handles have also been made entirely of soft metal cast upon the tang of the blade, and blades have been made with pronged tangs connected with a solid handle by embedding in cement or soft metal melted upon the joint, but not forming the bolster.

I claim—

1. The skeleton handle composed of a continuous wire bent into a loop, its ends being brought opposite one another and offset, combined with the shank placed in connection with the said ends and the metal bolster cast upon the meeting ends of the said handle and shank, and completely embedding the offset portion thereof to rigidly secure the said handle and shank together, substantially as described.

2. The skeleton-handle composed of a continuous wire having its ends offset and provided with mortises or sockets, combined with the blade and shank, offset and notched to form tenons to enter the said sockets in the handles, and a bolster of cast metal formed upon and to embed the joint between the said shank and handle, substantially as described.

In testimony whereof I have signed my name to this specification in the presence of two subscribing witnesses.

ORVILLE A. WILSON.

Witnesses:
HENRY A. HURLIN,
DANA D. GOODELL.